Figure 6:
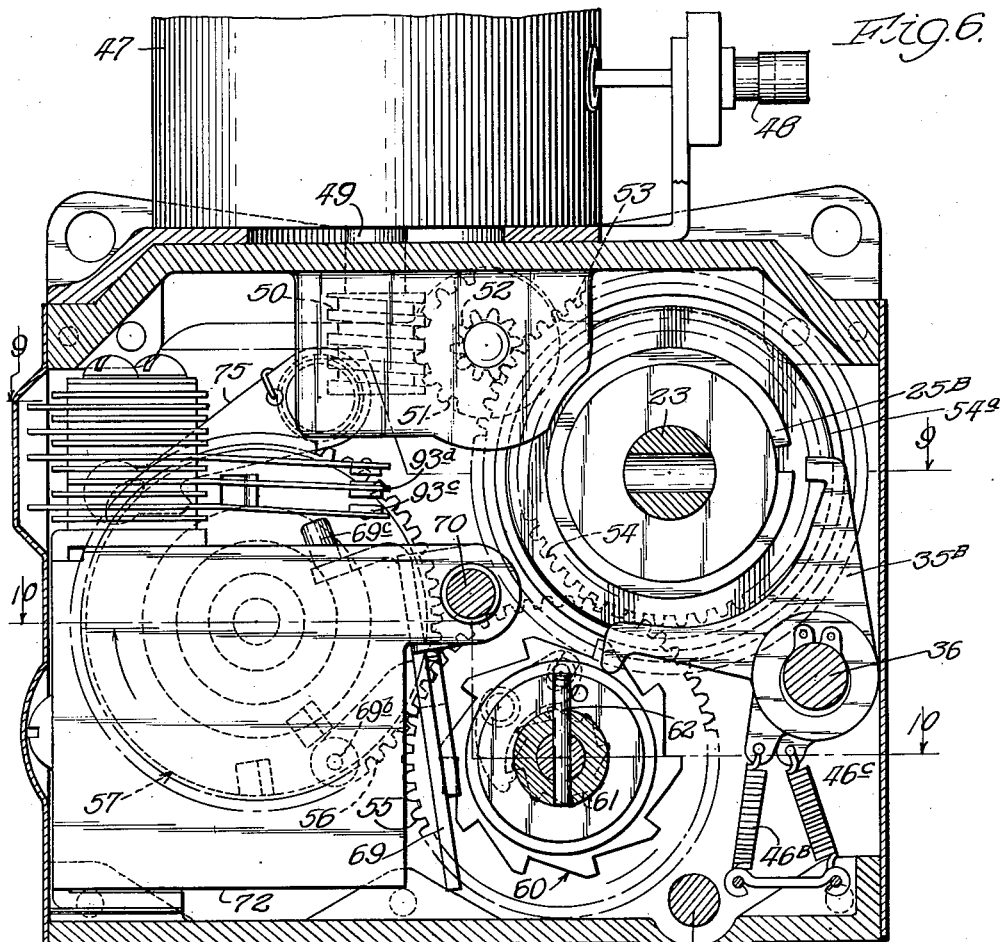

Feb. 19, 1952 R. W. MAY 2,585,955
SHAFT POSITIONING DEVICE
Filed Jan. 5, 1946 6 Sheets-Sheet 1
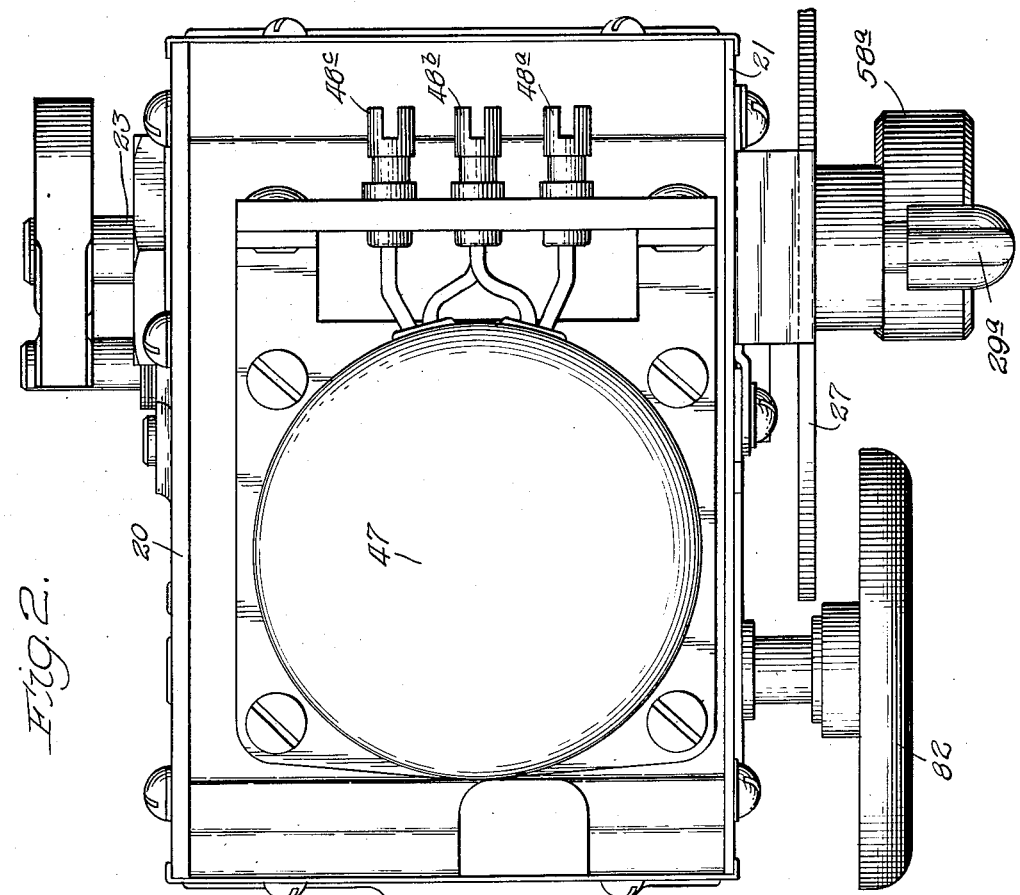
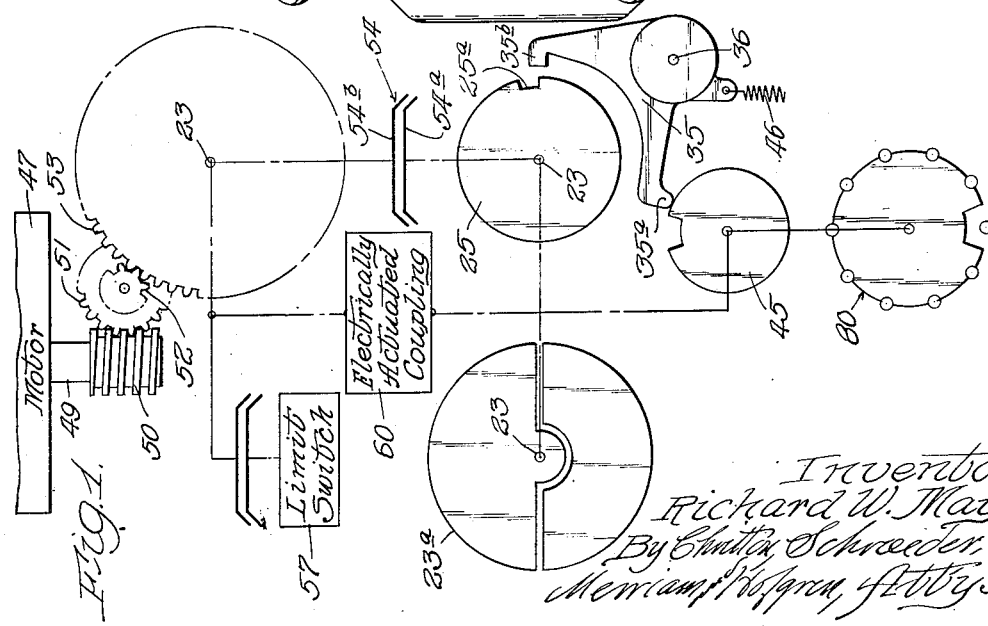
Inventor:
Richard W. May,
By Chritton Schroeder
Merriam Hofgren, Attys.

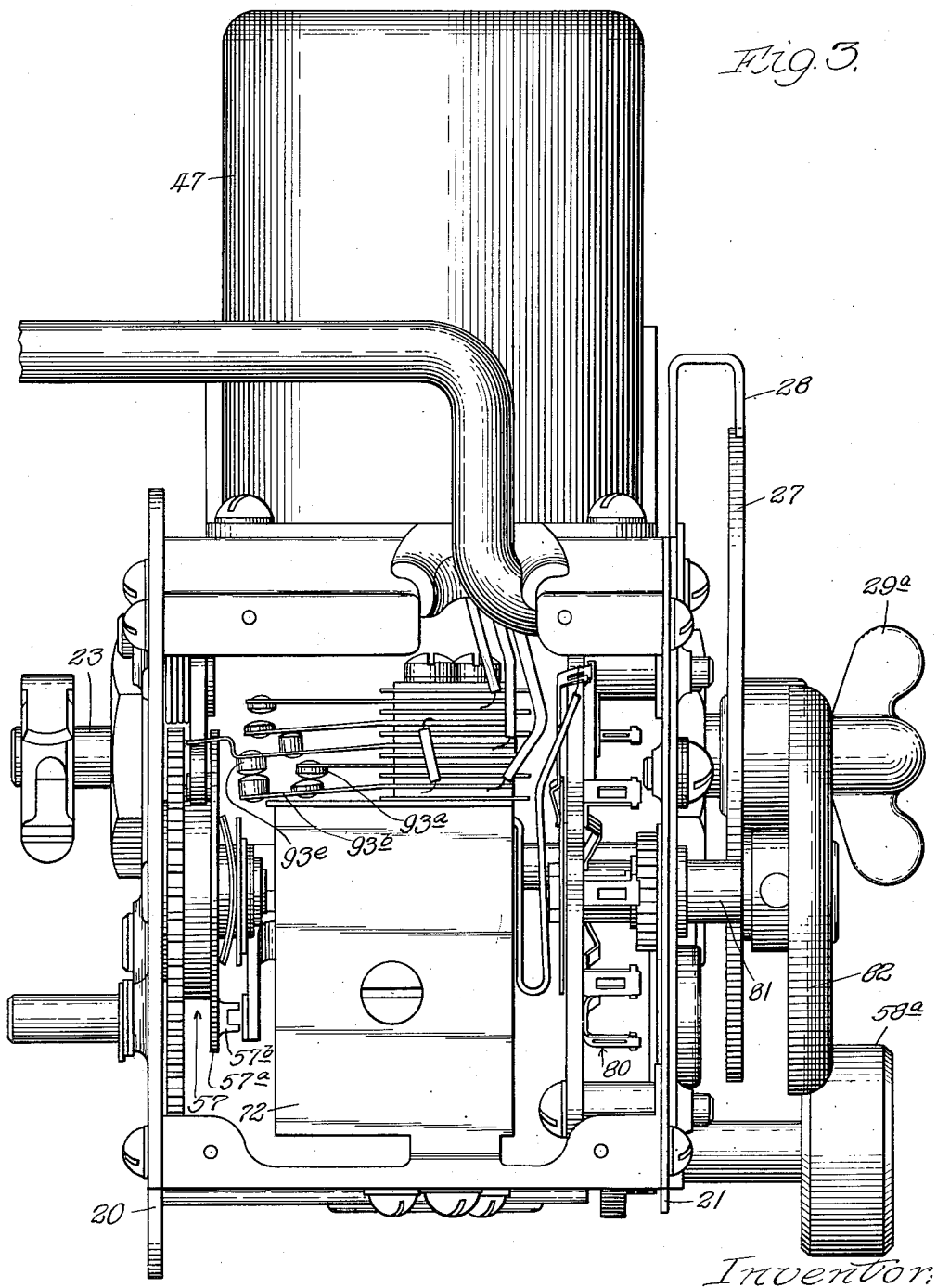

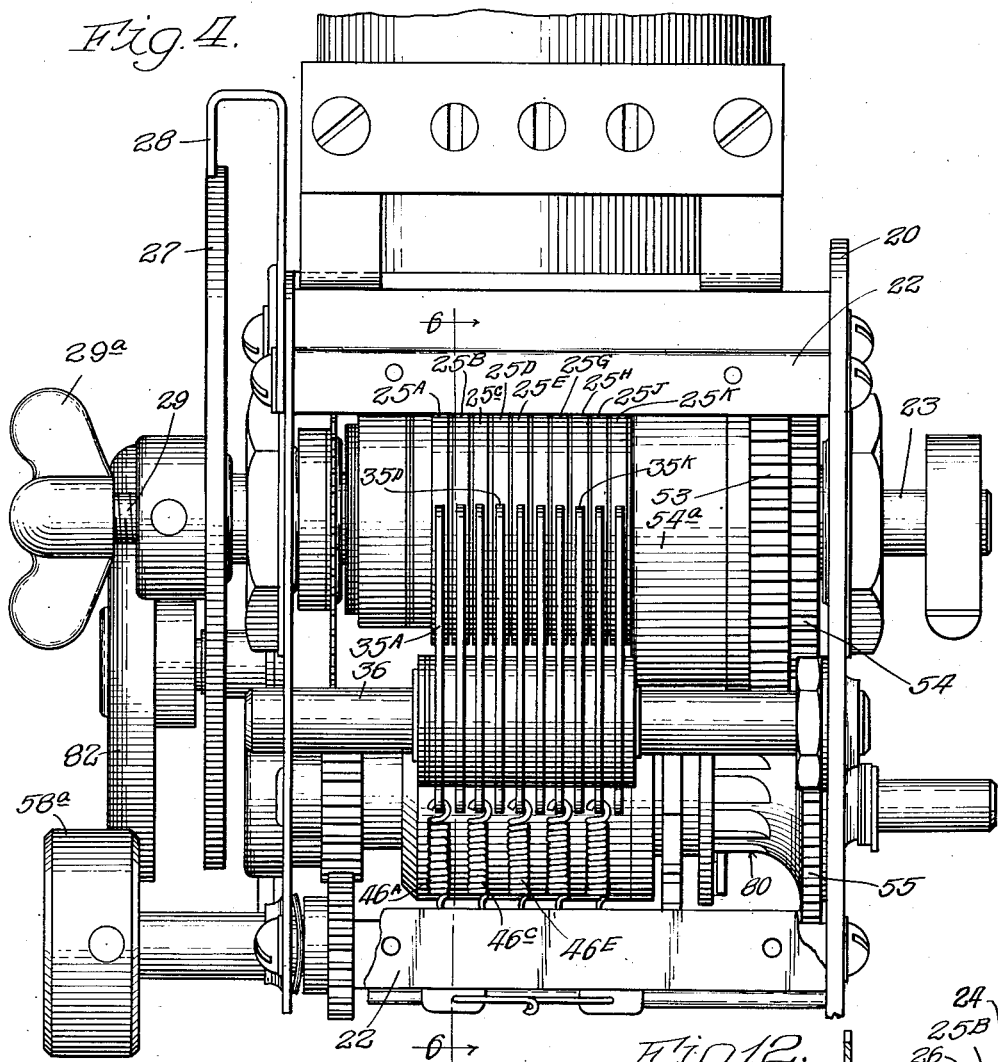
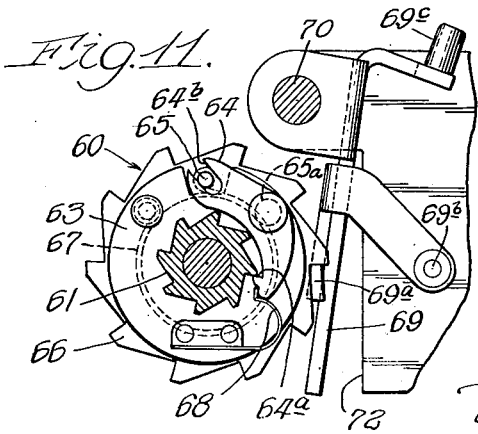

Feb. 19, 1952  R. W. MAY  2,585,955
SHAFT POSITIONING DEVICE
Filed Jan. 5, 1946  6 Sheets-Sheet 4
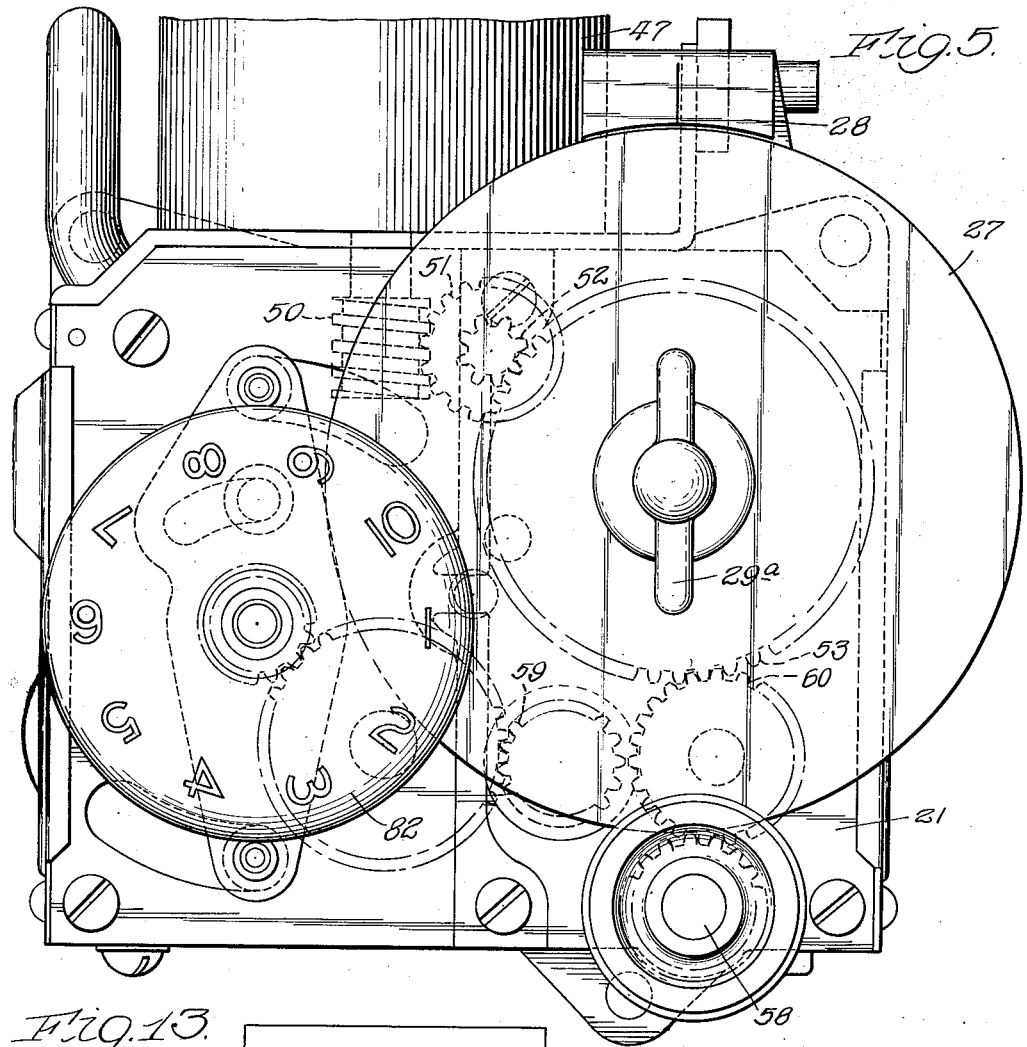
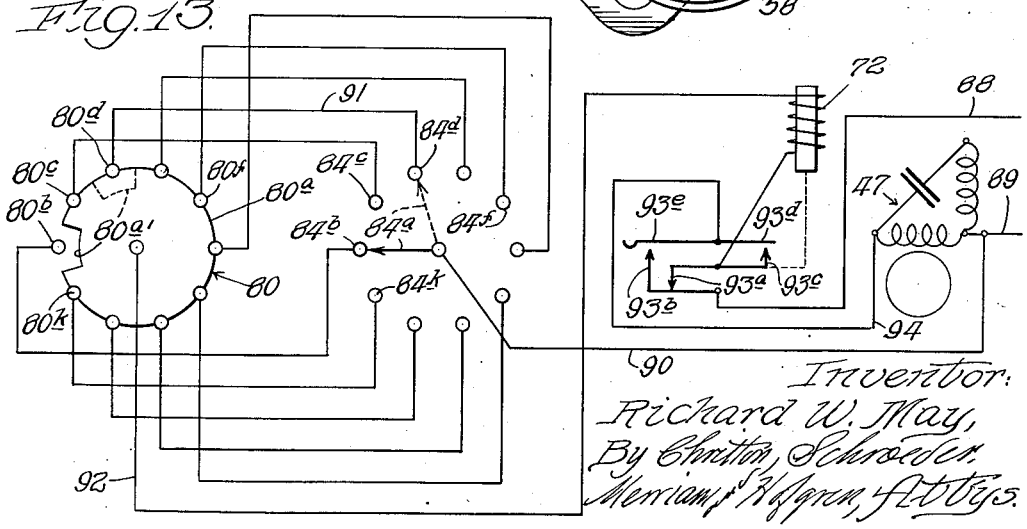
Inventor:
Richard W. May,
By Chritton, Schroeder,
Merriam & Ahlgren, Attys.

Feb. 19, 1952  R. W. MAY  2,585,955
SHAFT POSITIONING DEVICE
Filed Jan. 5, 1946  6 Sheets-Sheet 5

Inventor:
Richard W. May,
By Christh Schroeder
Merriam, Hoffman, Attys

Feb. 19, 1952   R. W. MAY   2,585,955
SHAFT POSITIONING DEVICE
Filed Jan. 5, 1946   6 Sheets-Sheet 6
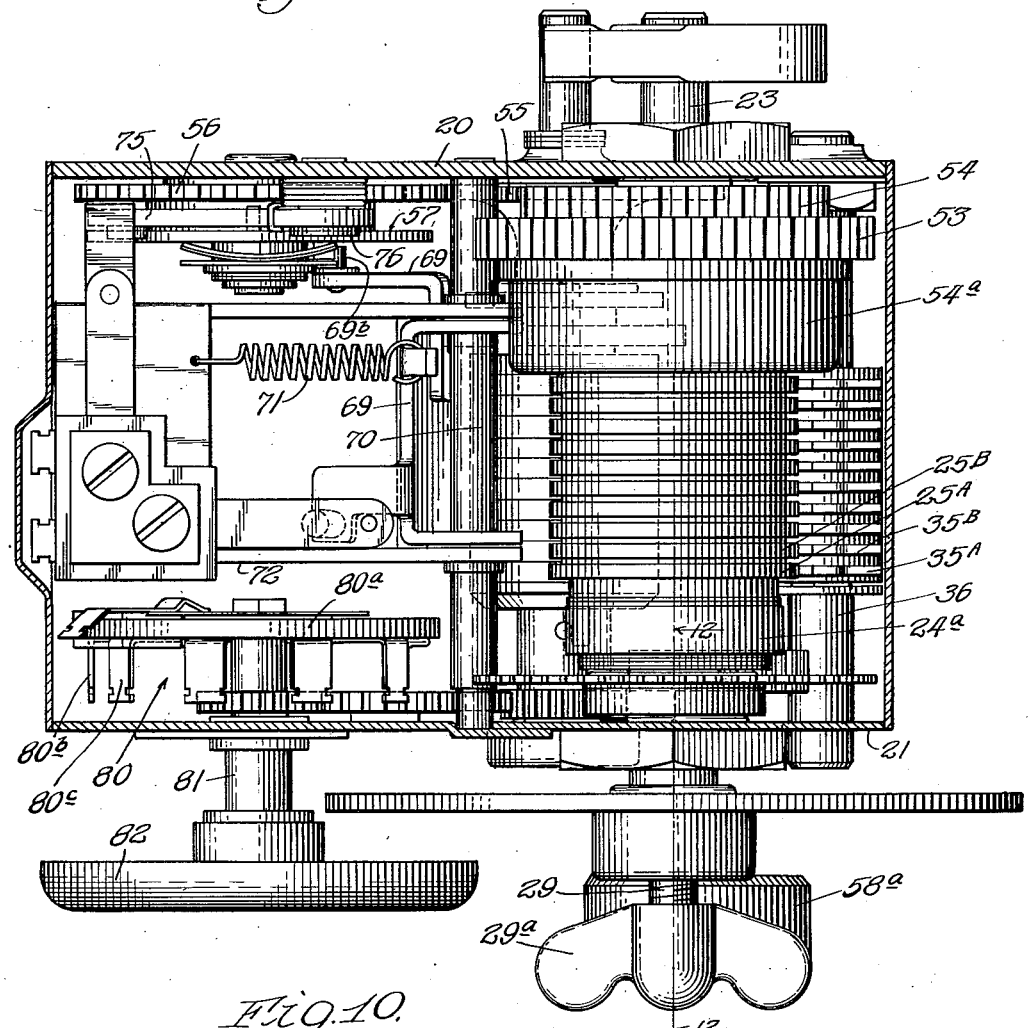
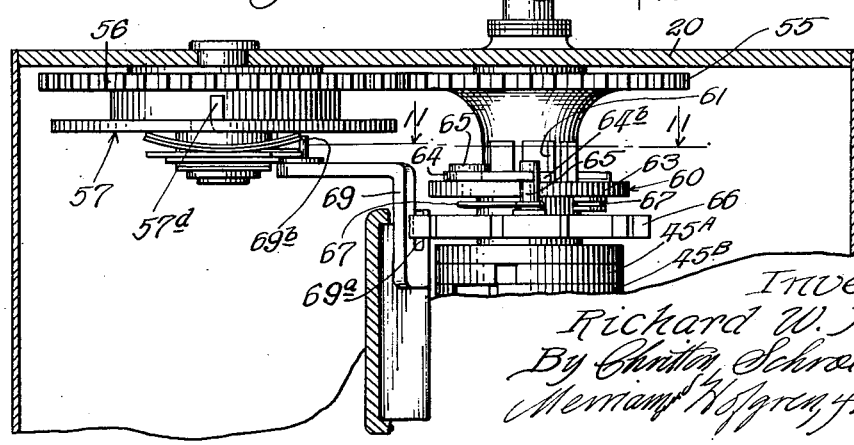
Inventor:
Richard W. May,
By Christen, Schroeder,
Merriam, Hofgren, Attys.

Patented Feb. 19, 1952

2,585,955

UNITED STATES PATENT OFFICE 2,585,955

SHAFT POSITIONING DEVICE

Richard W. May, Cedar Rapids, Iowa, assignor to Collins Radio Company, a corporation of Iowa Application January 5, 1946, Serial No. 639,198

11 Claims. (Cl. 192—142)

This invention relates to a shaft positioning device, and more particularly to means for automatically positioning a shaft at any desired selected point wherein the shaft and the rotatable parts of the positioning apparatus rotate in one direction only.

The shaft positioning apparatus with which this application is concerned is of the type wherein mechanical positioning of the shaft, and of a tuned element which may be associated with it, is effected by mechanical engagement of two parts of a stop combination, resulting in great precision and positiveness of action. Apparatus of this general type has been the subject of a number of patents heretofore issued, a representative patent being Collins Patent No. 2,285,414, issued June 9, 1942. All previous devices known to me for positively mechanically positioning a shaft, however, have involved rotation of the shaft and of the rotational positioning apparatus parts in two directions in each cycle. That is, as may be more fully understood by reference to the above patent, the shaft to be positioned is first rotated in one direction to a terminal position, and then rotated in the other direction until the desired mechanical stopping has been effected by a selected stop combination. This involves the use of a reversible drive arrangement, and presents certain problems and objections.

I have developed and am here disclosing and claiming a shaft positioning device which may, for example, be used to position the shaft of a radio condenser, and which always rotates in one direction only. Previous mechanical positioning systems rotated the shaft and any selecting means associated therewith, as a selector cam and selector switch, first in one direction to bring the shaft to an initial position and to effect selection of the stop combination which was later to be operative, and then reversed and drove the tuning shaft and its associated stop combination parts in the other direction until the selected stop combination acted mechanically to position the shaft at the desired point. In the system which I am here disclosing, however, selection of the desired stop combination is effected by rotating certain parts of the positioning apparatus, as the selector cam means and selector switch, together with the shaft to be positioned, in a certain direction until selection has been effected, whereupon the selector cam means and selector switch are uncoupled from the drive means and the shaft continues rotating in the same direction until stopped in the predetermined selected position by the selected stop combination. I achieve the desired coupling and uncoupling of the selector parts by an electrically actuated coupling means, a portion of the actuating circuit being through the selector switch in such manner that uncoupling is effected when the selector cam means and selector switch have reached a position selecting the desired stop combination.

Figure 7:
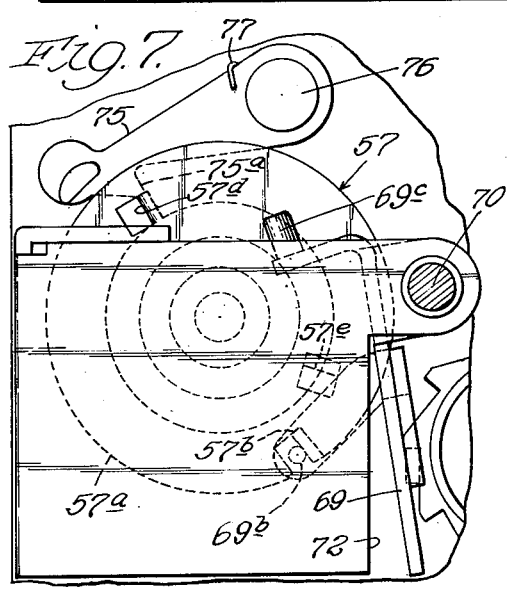
Figure 8:
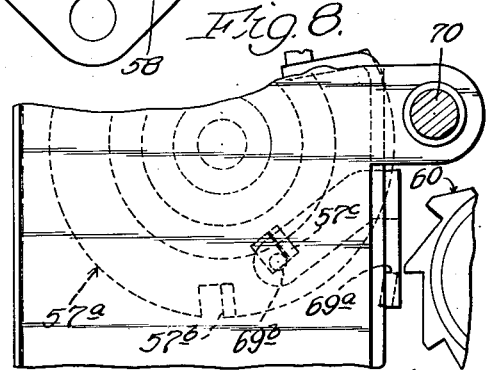

One feature of this invention is that it provides a simplified and more efficient automatic tuning means of a high degree of accuracy adapted to actuate a tuned element, as a variable condenser, in a radio transmitter or receiver; another feature of this invention is that it is particularly designed for and adapted to be embedded in tuning units wherein the drive motor is immediately associated with the shaft positioning apparatus and a part of the same unit, as contrasted with those having line shafts, cross shafts, and the like; yet another feature of this invention is that it eliminates the need for terminal stop arrangements necessary to limit the two directions of movement in previous automatic tuning devices of the reversible type; and a further feature of this invention is that it obviates any possibility of manually forcing a tuning shaft beyond the limit to which the automatic tuning apparatus can drive it, a difficulty sometimes occurring during manual setup of the types of devices heretofore in use. Other features and advantages of this invention will be apparent from the following specification and the drawings, in which:

Figure 1 is a schematic drawing of apparatus embodying my invention; Figure 2 is a top plan view of a unit comprising one embodiment of my invention; Figure 3 is a side elevational view of a unit shown in Figure 2, looking from the left of such figure; Figure 4 is a side elevational view of the opposite side of said unit, looking from the right of Figure 2; Figure 5 is a front elevational view of the unit; Figure 6 is a vertical sectional view along the line 6—6 of Figure 4; Figure 7 is a fragmentary detail view of the limit switch portion of the unit as shown in Figure 6, but with the limit switch in a different position; Figure 8 is a further fragmentary vertical sectional view concerned with the limit switch, but with the limit switch in still another position; Figure 9 is a plan view of the unit with the motor and top plate removed, along the line 9—9 of Figure 6; Figure 10 is a fragmentary horizontal sectional view along the line 10—10 of Figure 6; Figure 11 is a fragmentary detail view of the electrically actuated coupling arrangement, along the line 11—11 of Figure 10; Figure 12 is a fragmentary vertical sectional view of the main tuning shaft end, along the line 12—12 of Figure 9, particularly concerned with the means for clamping and unclamping the stop rings thereon; and Figure 13 is a wiring diagram of the unit.

The particular embodiment of my invention illustrated here is a "single-turn" unit, sometimes so termed in the art because it is associated with and designed to operate a shaft having a maximum range of movement (for the tuning operations desired) of 360° or less, as the tuning shaft of a variable condenser or gang of such condensers, a variometer, or the like. The general operation of the unit will first be briefly described with reference to Figure 1.

Referring now to the schematic illustration in Figure 1, manual operation of a selected arrangement completes the circuit (through the selector switch 80) which puts the electrically actuated coupling 60 into connected condition and starts the motor 47 which, through a worm 50 and suitable subsequent gearing, drives the main tuning shaft 23 connected to the rotor plates of the condenser 23a (through the slip clutch 54), and simultaneously rotates the selector cam drum 45 and selector switch 80 (through the coupling 60) and the limit switch 57. When the rotatable portion of the limit switch 80 reaches a position corresponding to that previously selected manually by operation of the electrical control, a circuit is opened which results in opening of the electrically actuated coupling, so that the selector cam drum 45 and rotatable portion of the selector switch 80 remains stationary. Meanwhile, however, through the preliminary motion of the limit switch 57 the motor circuit 47 is closed through another pair of contacts and operation of the motor 47 continues even though the original circuit (through the selector switch 80) which initiated the automatic tuning cycle, has now been opened. Meanwhile, the selector cam drum 45 has stopped in a position such that a cam slot is under the end 35a of the pawl 35 of the stop combination (comprising a pawl and the associated stop ring 25 on the main tuning shaft) which is selected to effect stopping at the predetermined point. This enables the end 35a of the pawl to drop into the slot in the cam (through action of the spring 46) and brings the other end 35b of the pawl on to the surface or outer periphery of the stop ring 25 of the combination selected. Continued operation of the motor 47 rotates the main tuned shaft and stop ring 25 until the slot 25a comes opposite the end 35b of the pawl, whereupon this end of the pawl drops into the slot and stopping is positively effected in the selected position resulting in positioning of the rotor plates of the condenser 23a at a point appropriate to operation on the radio channel desired. Operation of the motor 47 continues (the friction clutch 54 slipping) until the limit switch 57 has been rotated an amount sufficient to ensure one complete rotation of the main tuning shaft 23 if it had not been stopped earlier, whereupon the limit switch operates to open the circuit to the motor 47 and terminate the automatic tuning cycle.

In order properly to describe the structure of the particular unit here representing an embodiment of my invention, reference will now be had in particular to Figures 2–12, inclusive. It will be seen that the parts are housed within or operatively mounted on plates 20 and 21 held in appropriate relation to each other by spacer posts 22. The tuning shaft 23, adapted to rotate the condenser 23a has fixedly mounted thereon a drum 24, this drum having a longitudinally but non-rotatably movable front end or compression portion 24a. The drum carries the desired number (here shown as 10) of tuning stop rings 25A–K, these being separated by spacer rings 26 (see particularly Figure 12), these latter being keyed to the drum. The forward portion of the shaft 23 carries the tuning dial 27 adapted to cooperate with the indicating means or pointer 28 and is internally threaded to receive a locking stud 29 with a wing nut head or end portion 29a. When this stud is unscrewed it releases pressure on the end member 24a and loosens up the stop rings 25A–K so that they may be manually set (by operation of the tuning means) to selected positions; and tightening or inward movement of the locking stud transmits pressure through the end member 24a and locks the stop rings 25 fixedly in position on the stop ring drum. The way in which the stop rings are preset and the details of the locking arrangement and associated space washers and spring washers are well known in the art and have been fully described heretofore, as in the copending Collins application Serial No. 472,717, filed January 18, 1943, which issued as Patent No. 2,546,980 on April 3, 1951, and accordingly will not be gone into in detail here. It is sufficient for the purposes of this disclosure to point out that, by backing off the stud 29, each of the stop rings can be set to effect stopping in one of ten predetermined selected positions; and that they can then be locked in these predetermined positions by tightening up the stud 29.

Each stop ring 25A–K is adapted to be associated with a stop pawl, the corresponding stop pawls being here identified as 35A–K, these pawls being pivotally mounted on a pawl rocker shaft 36, as may be best seen in Figure 6. As has been described earlier in connection with Figure 1, the stopping end of a pawl is adapted to drop into the slot in a stop ring, as the slot shown immediately adjacent the end of the pawl in the stop ring 25B in Figure 6.

The other end of each pawl has a portion adapted to cooperate with a cam on the selector cam means or selector cam drum, the cams 45A–K cooperating respectively with the adjacent ends of the pawls 35A–K. The pawls are normally biased in such a direction that the ends cooperating with the cam rings always bear against the surface thereof, this being accomplished by springs 46A–K, the connector tabs for the springs being differently angularly arranged alternately to avoid interference between the springs, as may be best seen in Figure 6. Rotation of the cam drum to a certain position, which may for example be called No. 2 position, brings the slot in cam ring 45B adjacent the end of the pawl 35B, the spring 46B then pulling the pawl down until the other or stopping end thereof rides on the outer periphery of the stop ring 25B. As soon as the ring has traveled around (through further rotation of the tuned shaft 23 by the drive shaft) to a point where the slot therein is opposite the stopping end of the pawl, the pawl rotates further under influence of its spring and drops its stopping end into the slot to effect positive mechanical stopping of the tuned shaft precisely at the position selected for the stop combination comprising the stop ring 25B and the stop pawl 35B.

Driving of the unit is effected by a small electric motor in the motor housing 47, power therefor being supplied through appropriate connections to the terminals 48. As may be best seen in Figure 6, the motor shaft 49 carries a worm 50 meshing with an idler gear 51 driving a pinion 52 which in turn drives a gear 53 on the driven element of the friction clutch 54. This friction clutch preferably comprises a friction shoe rotated with the gear 53 and bearing against the inner surface of a friction drum 54a. Various satisfactory friction clutches or slip clutches for this purpose have heretofore been known and used and accordingly the clutch is not illustrated and described in detail. A preferred form of clutch, for example, is shown in the copending Collins application Serial No. 483,899 filed April 2, 1943, which issued as Patent No. 2,409,192 on October 15, 1946. Driving connections for the remainder of the apparatus are provided by a drive from the gear 53 (as may be seen in Figure 6) to the gear 55 comprising part of the driving element of the cam drum coupling arrangement; and from there to the gear 56 comprising the driving element for the limit switch identified in general as 57, the drive for the limit switch also being accomplished through a friction or slip clutch similar to that used in connection with the main tuning shaft, although not necessarily of as heavy duty construction. Referring more particularly to Figure 5, it will be seen that a gear connection is also provided between a manual tuning shaft 58 through intermediate pinion and idler combinations 59 and 60 to the gear 53 on the main tuning shaft, this enabling precision manual operation of the tuning means for setup or other manual tuning, the shaft 58 being provided with a conventional tuning knob 58a. As will be described more fully later, changing of the tuning selection starts the drive motor and causes operation of the gears 53, 55 and 56 until termination of the tuning cycle as determined by the limit switch, although the parts driven by these gears may have stopped earlier by virtue of operation of the slip clutches or the coupling arrangement.

The coupling arrangement may be best seen in Figures 6, 10 and 11, being identified in general as 60. This coupling means comprises a small ratchet toothed wheel 61 rigidly attached, as by the pin 62, to the gear 55 to be the driving element of the coupling. Mounted on the same shaft, but rotatable with respect thereto, is an intermediate member 63, this member carrying a pivoted element 64 pivotally mounted on the member 63 by the pin 65a. One end of this pivoted element 64 is provided with a latch or shoulder portion 64a adapted to engage a tooth of the toothed driving element 61; and the other end of the pivoted element 64 is provided with a slot 64b embracing a pin 65 rigidly mounted on a ratchet toothed driven element 66. A spring 67 normally urges the pivoted element in such a direction as to keep the pin within the slot 64b, where it has a small amount of lost motion or play, this spring being stronger than the light spring 68 tending to hold the end 64a of the lever out away from the teeth of the driving element. Under normal conditions, therefore, there is coupling between the driving and driven elements of the coupling 60, through the medium of engagement of a tooth on the driving element 61 with the shoulder 64a, so as to effect rotation of the intermediate member 63, engagement of the slot 64b with the pin 65 rotating the driven element and thus the selector cam drum 45 with which the driven element 66 is connected.

Coupling is electrically controlled (i. e., driving connection is made or broken) by operation of a relay actuated lever arm 69 pivotally mounted on the shaft 70. This lever arm is normally spring biased or urged in a direction bringing a shoulder portion 69a thereof into engagement with a tooth of the driven element 66 of the coupling, as may be best seen in Figure 11, by a spring 71 which may be best seen in Figure 9. This lever arm is moved in the other direction (clockwise as shown in Figure 6) by a magnet coil in the housing 72, when this coil is energized. When the shoulder 69a is in engagement with a tooth of the driven element 66 it serves to lock that element and the cam drum 45 in the position where engagement is made, continued rotation of the driving element 61 causing relative movement between the pin 65 and the pivoted element 64 in such direction as to disengage the shoulder 64a from a tooth of the driving element 61, the spring 68 serving to maintain the separation and prevent any catching of the teeth during continued idling rotation of the uncoupled driving element. On the other hand, when the lever arm 69 or armature is attracted by the coil 72 and the shoulder 69a thereof moves out of engagement with the tooth of the driven element, the spring 67 overcomes the spring 68 and the pivoted element 64 swings on its pin 65a to effect coupling engagement and rotation of the selector cam drum 45. The arrangement shown makes a very satisfactory and positive electrically actuated coupling wherein driving relation is always positively effected in one of ten possible positions (in the particular embodiment shown), and wherein the electrical means for effecting coupling and uncoupling is stationary and does not rotate with the rotatable parts of the coupling so that the electrical connections may be easily made. Moreover, as will become immediately apparent from the following description, the electrically controlled lever arm 69 serves as synchronizing means between action of the coupling and action of the limit switch indicated in general as 57. Referring now more particularly to Figures 6, 7 and 8, the limit switch includes a friction or slip clutch driven disk 57a having on one surface thereof variously spaced lugs or shoulder portions 57b, 57c and 57d. When a tuning cycle has been completed and the limit switch is at rest, the shoulder 57b is stopped by engagement with the pin 69b on an extension of the pivoted arm 69, and the shoulder 57d is under a cooperating portion 75a of the arm 75 pivoted on the shaft 76 and normally urged counterclockwise, as viewed in Figure 7, by the spring 77, the position of the parts as just described being shown in this Figure 7. Movement of electrical selecting means at a remote point to select a new channel, however, operates the relay 72 and attracts the pivoted arm 69, effecting coupling relation of the coupling 60, as described before, and moving the pin 69b in closer to the center of rotation of the limit switch disk 57a, to the position shown in Figure 8. Meanwhile, as will be more apparent from the circuit diagram, the drive motor 41 has been started and rotation of the parts has been effected thereby, so that the limit switch disk 57a has rotated about 20° until it is stopped by engagement of the shoulder 57c with the pin 69b, as shown in Figure 8. The limit switch stays in this position until selecting action has been effected and the selector cam drum 45 has been stopped at the position appropriate to rendering the selected stop combination operative, whereupon the relay 72 is deenergized and the arm 69 swings back to the position shown in Figure 7, holding the cam drum in the desired position and effecting uncoupling of the cam drum and selector switch drive. Movement of the arm 69 back to this original position moves the pin 69b out of engagement with the shoulder portion 57c and permits the limit switch disk 57a to rotate with the drive means until it is finally stopped again in the position shown in Figure 7. While this is only about 340° rotation of the limit switch disk, the gearing relation between the limit switch and the main tuning shaft is such that the tuning shaft has been permitted to make at least one complete revolution during this time, so that the lever arm 69 not only effects coupling and uncoupling of the selector cam drum drive, but also ensures, by synchronizing operation of the limit switch, at least one full rotation of the tuning shaft by the drive means after selection has been effected to provide for stopping anywhere in the full 360° of rotation of the tuning shaft, by the selected stop combination. The arm 69a is provided with a projecting portion 69c adapted to cooperate with the spring arm contacts best seen in Figure 3, the operation of which will be more apparent from a consideration of the circuit diagram of Figure 13.

Before describing the circuit diagram and sequence of circuit operations it must be pointed out that a selector switch indicated in general as 80 is mounted to one side of the cam drum 45 (as may be best seen in Figure 9), but is gear connected to the cam drum drive so that the rotatable part 80a of the selector switch is rotated synchronously with and only when the cam drum 45 is rotated. This rotatable portion is mounted on a shaft 81 which also carries a selection indicating dial 82 adapted to indicate which automatic tuning position has been remotely selected. In the particular embodiment of the selector switch shown here the rotatable portion 80a is associated with ten contact elements 80b–k, and as may be seen in Figure 13 each of these contact elements is wired to another corresponding contact element, as the contact elements 84b–k associated with a manually rotatable selector switch arm 84a. The rotatable disk portion 80a of the selector switch 80 has a slot or open circuit portion 80a' adapted to open a circuit when the selector switch disk portion has been rotated until its position brings the slot adjacent the contact which has been energized from the remote point.

Referring now more particularly to the circuit diagram comprising Figure 13, the parts are shown as they are at the termination of an automatic tuning cycle, it being noted that the slot in the selector switch disk 80a is adjacent the contact 80b, so that the circuit through the selector switch has been broken. If it is now desired to select some other channel from the remote point, the switch arm 84a would be moved to some other position, as for example that shown in dotted lines where it is in engagement with the contact 84d. A circuit is then completed from one side of any suitable source of power (as conventional 110 volt, 60 cycle A. C. supplied to the wires 88 and 89), through the wire 90, the switch arm 84a, the contact 84d, the wire 91, the contact 80d, the selector switch disk 80a, and the wire 92 to one end of the relay coil 72. Connection is completed from the other end of the relay coil through the spring arm contacts 93a and 93b back to the wire 88, so that the relay coil 72 is energized. This results in shifting coupling control arm 69, as heretofore described, and (as may be best seen in Figure 6), results in the closing of the contacts 93c and 93d. This completes a motor drive circuit from the lead 89 through the field of the motor 47, the wire 94, the contacts 93c and 93d and the contacts 93a and 93b back to the other line wire 88, resulting in operation of the motor. One of the advantages of this system, where the motor always operates in the same direction, is that a conventional A. C. motor may be conveniently used. Since the coupling is in connected position, operation of the drive motor results in rotation of the main tuning shaft, of the cam drum and selector switch, and of the limit switch disk 57a. This latter element rotates only until the pin 69b strikes the stop 57c (see Figure 8), but the cam drum 45 and selector switch disk 80a rotate until the slot 80a' is adjacent the contact 80d, as shown in dotted lines in Figure 13. This results in opening the circuit through the relay coil 72, and the arm 69 drops back, latching the cam drum 45 in the selected position and freeing the limit switch disk for further rotation. At the same time, movement of this lever arm opens contacts 93c and 93d. However, the motor circuit is not broken, since rotation of the limit switch from the position shown in Figure 7 to that shown in Figure 8 has resulted in permitting contact 93e to drop down into engagement with contact 93b (through movement of the arm 75 as a result of the stop 57d moving), so that the motor circuit remains closed. Accordingly, the selector switch disk 80a and the cam drum 45 remain stationary while the tuning shaft and limit switch disk 57a rotate until the tuning shaft has been stopped at the predetermined position by the selected stop combination, its drive continuing to rotate (through operation of the slip clutch) until the limit switch disk has come around again to the position shown in Figure 7, effecting opening of the motor circuit by separating the contact 93e from the contact 93b. While the actual embodiment of the invention illustrated structurally in the drawings contains other contacts for purposes of interlocking operations, illumination of pilot lights and the like, they are immaterial to the operation of the new system here being disclosed and claimed, and accordingly will not be described in detail.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. Apparatus of the character described for positioning a rotatable shaft, including: drive means adapted to rotate the shaft, this means being operable in one direction only; a plurality of stop combinations, each such combination being adapted to stop the shaft at a predetermined point; selecting means for rendering operative a desired one of said stop combinations, this means including rotatable means comprising a selector switch and selector cam means both adapted to be rotated by said drive means; and coupling means connected electrically to said selector switch for connecting said rotatable means to and disconnecting it from said drive means, at least the disconnecting operation of said coupling means being effected as a function of the position of said selector switch.

2. Apparatus of the character described for positioning a rotatable shaft, including: drive means adapted to rotate the shaft, this means being operable in one direction only; a plurality of stop combinations, each such combination being adapted to stop the shaft at a predetermined point; selecting means for rendering operative a desired one of said stop combinations, this means including rotatable means comprising a selector switch and selector cam means connected together and both adapted to be rotated by said drive means; and electrically controlled coupling means for connecting said rotatable means to and disconnecting it from said drive means, disconnecting operation of said coupling means being effected as a function of the position of said selector switch.

3. Apparatus of the character described for positioning a rotatable shaft, including: drive means adapted to rotate the shaft, this means being operable in one direction only; a plurality of stop combinations, each such combination being adapted to stop the shaft at a predetermined point; rotatable selector cam means for rendering operative a desired one of said stop combinations; a rotatable selector switch means connected to said selector cam means; electrically controlled coupling means for connecting said rotatable means to and disconecting them from said drive means; and a control circuit for said coupling means including said selector switch.

4. Apparatus of the character described for positioning a rotatable shaft, including: drive means adapted to rotate the shaft, this means being operable in one direction only; a plurality of stop combinations, each such combination being adapted to stop the shaft at a predetermined point; rotatable selector cam means for rendering operative a desired one of said stop combinations; a rotatable selector switch means connected to said selector cam means; electrically controlled coupling means for connecting said rotatable means to and disconnecting them from said drive means; a control circuit for said coupling means including said selector switch; and means for causing operation of said drive means for a sufficient period after said cam means and switch have reached the selected position to enable said shaft to rotate through the maximum range desired and then terminating the operation of said drive means.

5. Apparatus of the character described for positioning a rotatable shaft, including: drive means adapted to rotate the shaft, this means being operable in one direction only; a plurality of stop combinations, each such combination being adapted to stop the shaft at a predetermined point; rotatable selector cam means for rendering operative a desired one of said stop combinations; a rotatable selector switch means connected to said selector cam means; electrically controlled coupling means for connecting said rotatable means to and disconnecting them from said drive means; a control circuit for said coupling means including said selector switch; limit switch means adapted to terminate operation of said drive means; and means for synchronizing operation of said coupling means and said limit switch means.

6. Apparatus of the character described for positioning a rotatable shaft, including: drive means adapted to rotate the shaft, this means being operable in one direction only; a plurality of stop combinations, each such combination being adapted to stop the shaft at a predetermined point; rotatable selector cam means for rendering operative a desired one of said stop combinations; a rotatable selector switch means connected to said selector cam means; electrically controlled coupling means for connecting said rotatable means to and disconnecting them from said drive means; a control circuit for said coupling means including said selector switch; limit switch means adapted to terminate operation of said drive means; and means movable into and out of engagement with a portion of said limit switch means as a function of operation of said coupling means for causing operation of said drive means for a sufficient period after said cam means and switch have reached the selected position to enable said shaft to rotate through the maximum range desired and then terminating the operation of said drive means.

7. Apparatus of the character described for positioning a rotatable shaft, including: drive means adapted to rotate the shaft, this means being operable in one direction only; a plurality of stop combinations, each such combination being adapted to stop the shaft at a predetermined point; rotatable selector cam means for rendering operative a desired one of said stop combinations; a rotatable selector switch means connected to said selector cam means; electrically controlled coupling means for connecting said rotatable means to and disconnecting them from said drive means; a control circuit for said coupling means including said selector switch; limit switch means adapted to terminate operation of said drive means; and means for initiating operation of said drive means and effecting connecting operation of said coupling means to rotate said cam means and selector switch to a selected position, said selector switch thereupon effecting disconnecting operation of said coupling means.

8. Apparatus of the character described for positioning a rotatable shaft, including: drive means adapted to rotate the shaft, this means being operable in one direction only; a plurality of stop combinations, each such combination being adapted to stop the shaft at a predetermined point; selecting means for rendering operative a desired one of said stop combinations, this means including rotatable means comprising a selector switch and selector cam means both adapted to be rotated by said drive means and coupling means for connecting said rotatable means to and disconnecting it from said drive means, this coupling means comprising driving and driven rotatable members and separate electrically actuated means for effecting driving connection between said rotatable members.

9. Apparatus of the character described for positioning a rotatable shaft, including: drive means adapted to rotate the shaft, this means being operable in one direction only; a plurality of stop combinations, each such combination being adapted to stop the shaft at a predetermined point; selecting means for rendering operative a desired one of said stop combinations, this means including rotatable means comprising a selector switch and selector cam means both adapted to be rotated by said drive means; and coupling means for connecting said rotatable means to and disconnecting it from said drive means, this coupling means comprising driving and driven rotatable members and separate electrically actuated pivotally movable means for effecting driving connection between said rotatable members.

10. Apparatus of the character described for positioning a rotatable shaft, including: drive means adapted to rotate the shaft, this means being operable in one direction only; a plurality of stop combinations, each such combination being adapted to stop the shaft at a predetermined point; selecting means for rendering operative a desired one of said stop combinations, this means including rotatable means comprising a selector switch and selector cam means both adapted to be rotated by said drive means; and coupling means for connecting said rotatable means to and disconnecting it from said drive means, this coupling means comprising driving and driven rotatable members, an intermediate rotatable member, and separate electrically actuated pivotally movable means for effecting driving connection between said rotatable members.

11. Apparatus of the character described for positioning a rotatable shaft, including: drive means adapted to rotate the shaft, this means being operable in one direction only; a plurality of stop combinations, each such combination including means for mechanically stopping the shaft at a predetermined point during its rotation by the drive means; selecting means for rendering operative a desired one of said stop combinations, this means including rotatable means adapted to be rotated by said drive means; and electrically controlled coupling means for connecting said rotatable means to and disconnecting it from said drive means.

RICHARD W. MAY.

REFERENCES CITED

The following references are of record in the file of this patent:

UNITED STATES PATENTS

| Number | Name | Date |
|---|---|---|
| 2,067,992 | Thomas | Jan. 19, 1937 |
| 2,229,634 | Bonham | Jan. 28, 1941 |
| 2,235,195 | Bell | Mar. 18, 1941 |
| 2,285,414 | Collins | June 9, 1942 |
| 2,323,170 | Wassell | June 29, 1943 |
| 2,351,185 | Botterweg et al. | June 13, 1944 |
| 2,374,293 | Leishman | Apr. 24, 1945 |
| 2,391,470 | May | Dec. 25, 1945 |
| 2,413,211 | Brian | Dec. 24, 1946 |
| 2,496,457 | Elliott | Dec. 7, 1950 |